United States Patent
Kalinichenko et al.

(10) Patent No.: US 12,425,462 B2
(45) Date of Patent: Sep. 23, 2025

(54) SURFACING RELEVANT TOPICS IN A GROUP-BASED COMMUNICATION SYSTEM

(71) Applicant: Salesforce, Inc., San Francisco, CA (US)

(72) Inventors: Oleksii Kalinichenko, Burnaby (CA); Akshay Bakshi, Vancouver (CA); Leena Mansour, Toronto (CA)

(73) Assignee: Salesforce, Inc., San Francisco, CA (US)

( * ) Notice: Subject to any disclaimer, the term of this patent is extended or adjusted under 35 U.S.C. 154(b) by 1 day.

(21) Appl. No.: 18/513,488

(22) Filed: Nov. 17, 2023

(65) Prior Publication Data
US 2024/0089307 A1    Mar. 14, 2024

Related U.S. Application Data

(63) Continuation of application No. 17/390,326, filed on Jul. 30, 2021, now Pat. No. 11,863,603.

(51) Int. Cl.
*H04L 65/403*     (2022.01)

(52) U.S. Cl.
CPC .................. *H04L 65/403* (2013.01)

(58) Field of Classification Search
CPC ............. H04L 65/403; G06F 3/0482
See application file for complete search history.

(56) References Cited

U.S. PATENT DOCUMENTS

| | | | |
|---|---|---|---|
| 8,649,494 B2 | 2/2014 | Basson et al. | |
| 8,649,499 B1* | 2/2014 | Koster | H04M 3/5175 379/265.06 |
| 9,560,152 B1* | 1/2017 | Jamdar | G06F 16/93 |
| 9,602,559 B1* | 3/2017 | Barros | H04L 65/403 |
| 9,652,113 B1* | 5/2017 | Colson | G06Q 10/1095 |
| 10,885,131 B2* | 1/2021 | Bagheri | G06F 16/9535 |
| 11,012,575 B1* | 5/2021 | Leblang | G06Q 10/109 |
| 2009/0112985 A1* | 4/2009 | Quinn | G06Q 10/00 709/204 |
| 2009/0157709 A1 | 6/2009 | Kruger et al. | |
| 2011/0268263 A1 | 11/2011 | Jones et al. | |
| 2011/0270933 A1 | 11/2011 | Jones et al. | |
| 2011/0289433 A1 | 11/2011 | Whalin et al. | |

(Continued)

OTHER PUBLICATIONS

Office Action for U.S. Appl. No. 17/390,326, mailed on Dec. 22, 2022, Oleksii Kalinichenko, "Surfacing Relevant Topics in a Group-Based Communication System", 19 pages.

(Continued)

*Primary Examiner* — Andrew T Chiusano
(74) *Attorney, Agent, or Firm* — Lee & Hayes, P.C.

(57) ABSTRACT

A system, method, and computer-readable media for surfacing relevant topics discussed in a synchronous multimedia collaboration session to interested nonparticipants of the synchronous multimedia collaboration session. A relevant topic of the synchronous multimedia collaboration session may be determined based in part on audio data from the synchronous multimedia collaboration session. At least one nonparticipating member with an interest in the relevant topic of the synchronous multimedia collaboration session may be identified. A notification of the synchronous multimedia collaboration session associated with the relevant topic may be surfaced to the at least one non-participating member.

20 Claims, 6 Drawing Sheets

(56) References Cited

U.S. PATENT DOCUMENTS

| | | |
|---|---|---|
| 2011/0307550 A1 | 12/2011 | Bastide et al. |
| 2012/0224021 A1 | 9/2012 | Begeja et al. |
| 2014/0123027 A1 | 5/2014 | Kozloski et al. |
| 2018/0046957 A1 | 2/2018 | Yaari et al. |
| 2018/0048751 A1 | 2/2018 | Crowell et al. |
| 2018/0205797 A1 | 7/2018 | Faulkner |
| 2018/0287982 A1 | 10/2018 | Draeger et al. |
| 2019/0305976 A1 | 10/2019 | Bender et al. |
| 2019/0334956 A1* | 10/2019 | Hodgins ............... H04L 67/306 |
| 2020/0403817 A1 | 12/2020 | Daredia et al. |
| 2020/0412564 A1 | 12/2020 | Roedel et al. |
| 2021/0044559 A1 | 2/2021 | Jain et al. |
| 2021/0110327 A1 | 4/2021 | Bellet et al. |
| 2021/0250390 A1 | 8/2021 | Clark |
| 2021/0258427 A1 | 8/2021 | Lee et al. |
| 2022/0030042 A1 | 1/2022 | Roedel et al. |
| 2023/0030976 A1 | 2/2023 | Kalinichenko et al. |

OTHER PUBLICATIONS

Office Action for U.S. Appl. No. 17/390,326, mailed on Mar. 3, 2022, Oleksii Kalinichenko, "Surfacing Relevant Topics in a Group-Based Communication System", 17 pages.

Office Action for U.S. Appl. No. 17/390,326, mailed on Jun. 29, 2023, Oleksii Kalinichenko, "Surfacing Relevant Topics in a Group-Based Communication System", 5 pages.

Office Action for U.S. Appl. No. 17/390,326, mailed on Aug. 29, 2022, Oleksii Kalinichenko, "Surfacing Relevant Topics in a Group-Based Communication System", 18 pages.

"Die, Email, Die! A Flickr Cofounder Aims To Cut Us All Some Slack", ReadWriteWeb, LexisNexis, https://advance.lexis.com/api/permalink/33dd79e2-90f5-409d-ae27 -5a2c7 e86bf31/?context=1000516>. ( dated Aug. 14, 2013, 4:15 PM) 2 pages.

"How Slack changed the way we work by putting the customer experience first", Repeat Customer Podcast, Episode 3, [online][retrieved May 9, 2019]. Retrieved from the Internet: <URL: https://www .zendesk.com/resources/ slack-customer-experience/, (2019) 13 pages.

Adrienne Lafrance, "The Triumph of Email", Atlantic Online, LexisNexis, https://advance.lexis.com/api/permalink/32d7ddd9-d4c1-4a73-86f7-08ab5842fde6/?context=1000516, (dated Jan. 6, 2016) 5 pages.

David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws--0f-:lefeat.html>. dated May 28, 2014, 2:48 PM) 8 pages.

Ernie Smith, "Picking Up The Slack", Tedium, [online][retrieved May 9, 2019]. Retrieved from the Internet: <URL: https://tedium.co/2017/10/17/irc-vs-slack-chat-history/>. (dated Oct. 17, 2017) 13 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 20 pages.

Jonathan Vanian, "Why these startups think chat apps are the next big thing in workplace collaboration", Gigaom, LexisNexis, https://advance.lexis.com/api/permalink/e83778c8-09c8-43aa-9ba0-88526283de69/?context= 1000516, (dated Aug. 1, 2014, 5:45 PM) 4 pages.

Matsumoto, T. et al., "Chocoa Communicator—A New Communication System Based on Awareness and Text Communications-", Fujitsu Sci. Tech. J., 36, 2, (Dec. 2000) 154-161.

Matthew Ingram, "Flickr co-founder launches Slack, an all-in-one messaging tool designed to kill email forever", Gigaom, LexisNexis, https://advance.lexis.com/api/permalink/0b676b 7 c-aec3-4560-861 e-d030d 1dd008c/?context=1000516, ( dated Feb. 12, 2014, 7:03 PM), 2 pages.

Michael Carney, "Slack is thriving on a cocktail of whimsy and great timing", Pandodaily, LexisNexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Mike Issac, "Slack, a Start-Up With an App to Foster Business Collaboration, Is Valued at $1.1 Billion", The New York Times Blogs (Bits), LexisNexis, https://advance.lexis.com/api/permalink/3eb84b34- a8f9-4d7d-9573-89d9598a4963/?context=1000516>. (dated Oct. 31, 2014) 2 pages.

Oikarinen, J_ & Reed, D., "Internet Relay Chat Protocol", Request for Comments: 1459, Network Working Group, [online][retrieved May 30, 2019]. Retrieved from the Internet: <URL: https://www.rfc --editor.org/rfc/rfc1459.txt>. (dated May 1993) 57 pages.

Rebecca Walberg, "Email biggest office waste of time: survey", National Post, At FP10, LexisNexis, https://advance.lexis.com/api/permalink/96268e3f-26ad-48ac--a98f-6c39804ebded/?context=1000516, (dated Mar. 4, 2014) 2 pages.

Robert Hof, "Stewart Butterfield On How Slack Became A :. 2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/~7c31937d7d9c>. (dated Jun. 2, 2015, 3;25 PM), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

* cited by examiner

SURFACING RELEVANT TOPICS IN A GROUP-BASED COMMUNICATION SYSTEM

CROSS-REFERENCE TO RELATED APPLICATIONS

This application is a continuation of, and claims priority to, co-pending, commonly-owned U.S. patent application Ser. No. 17/390,326 filed on Jul. 30, 2021, which is incorporated herein in its entirety by reference.

TECHNICAL FIELD

Embodiments of the invention relate to determining topics discussed in a conversation and notifying a user that the topic is being discussed. More specifically, embodiments of the invention relate to determining conversation topics in a synchronous multimedia collaboration session, identifying a non-participating member of the session with an interest in the determined conversation topics, and notifying the non-participating member that the conversation topic is being discussed in the multimedia collaboration session.

Typically, when meetings are in-progress, it can be difficult for an interested party who is not present in the meeting to know that topics of interest to them are being discussed. This is especially true when meetings are occurring virtually via a video or audio call. For a non-participant to be notified that a meeting is discussing a topic of interest to them, it is often required that a participant in the meeting know of the nonparticipant's interest and reach out to inform them of the discussion.

Accordingly, what is needed is a system that identifies a relevant topic of a meeting (such as a synchronous multimedia collaboration session), identifies nonparticipants who have an interest in the relevant topic, and notifies the non-participants about the meeting such that the non-participants can join the meeting or review a recording or transcript of the meeting after the fact.

SUMMARY

Embodiments of the invention solve the above-mentioned problems by providing a system, method, and computer-readable media for notifying a non-participating member of a topic of interest discussed in a synchronous multimedia collaboration session within a group-based communication system. Topics of interest for the non-participating member may be determined in part based on the activity of the nonparticipating member within the group-based communication system.

A first embodiment of the invention is directed to one or more non-transitory computer-readable media storing computer-executable instructions that, when executed by a processor, perform a method of notifying a non-participating member of a topic of interest discussed in a synchronous multimedia collaboration session in a group-based communication system, the method comprising determining, during a live synchronous multimedia collaboration session of the group-based communication system, a topic of the live synchronous multimedia collaboration session based at least in part on audio data associated with the live synchronous multimedia collaboration session, identifying, based on the topic, at least one interested non-participating member of the group-based communication system, the interested non-participating member of the group-based communication system not currently participating in the live synchronous multimedia collaboration session, and displaying a recommendation of the live synchronous multimedia collaboration session to the at least one interested non-participating member of the group-based communication system, via a user interface of the group-based communication system during the live synchronous multimedia collaboration session, wherein the recommendation includes the topic and contextual data associated with the live synchronous multimedia collaboration session.

A second embodiment of the invention is directed to a method of notifying a non-participating member of a topic of interest discussed in a synchronous multimedia collaboration session in a group-based communication system, the method comprising determining, during a live synchronous multimedia collaboration session of the group-based communication system, a topic of the live synchronous multimedia collaboration session based at least in part on audio data associated with the live synchronous multimedia collaboration session, identifying, based on the topic, at least one interested non-participating member of the group-based communication system, the interested nonparticipating member of the group-based communication system not currently participating in the live synchronous multimedia collaboration session, and displaying a recommendation of the live synchronous multimedia collaboration session with the topic to the at least one interested non-participating member of the group-based communication system, via a user interface of the group-based communication system during the live synchronous multimedia collaboration session, wherein the recommendation includes the topic and contextual data associated with the live synchronous multimedia collaboration session.

A third embodiment of the invention is directed to a system for notifying a non-participating member of a topic of interest discussed in a synchronous multimedia collaboration session in a group-based communication system, the system comprising a data store, a processor, and one or more non-transitory computer-readable media storing computer-executable instructions, that when executed by the processor, perform a method of notifying the non-participating member of the topic of interest discussed in the synchronous multimedia collaboration session in the group-based communication system, the method comprising determining, during a live synchronous multimedia collaboration session of the group-based communication system, a topic of the live synchronous multimedia collaboration session based at least in part on audio data associated with the live synchronous multimedia collaboration session, identifying, based on the topic, at least one interested non-participating member of the group-based communication system, the interested non-participating member of the group-based communication system not currently participating in the live synchronous multimedia collaboration session, and displaying a recommendation of the live synchronous multimedia collaboration session with the topic to the at least one interested nonparticipating member of the group-based communication system, via a user interface of the group-based communication system during the live synchronous multimedia collaboration session, wherein the recommendation includes the topic and contextual data associated with the live synchronous multimedia collaboration session.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWINGS

Embodiments of the invention are described in detail below with reference to the attached drawing figures, wherein.

Figure 1A:
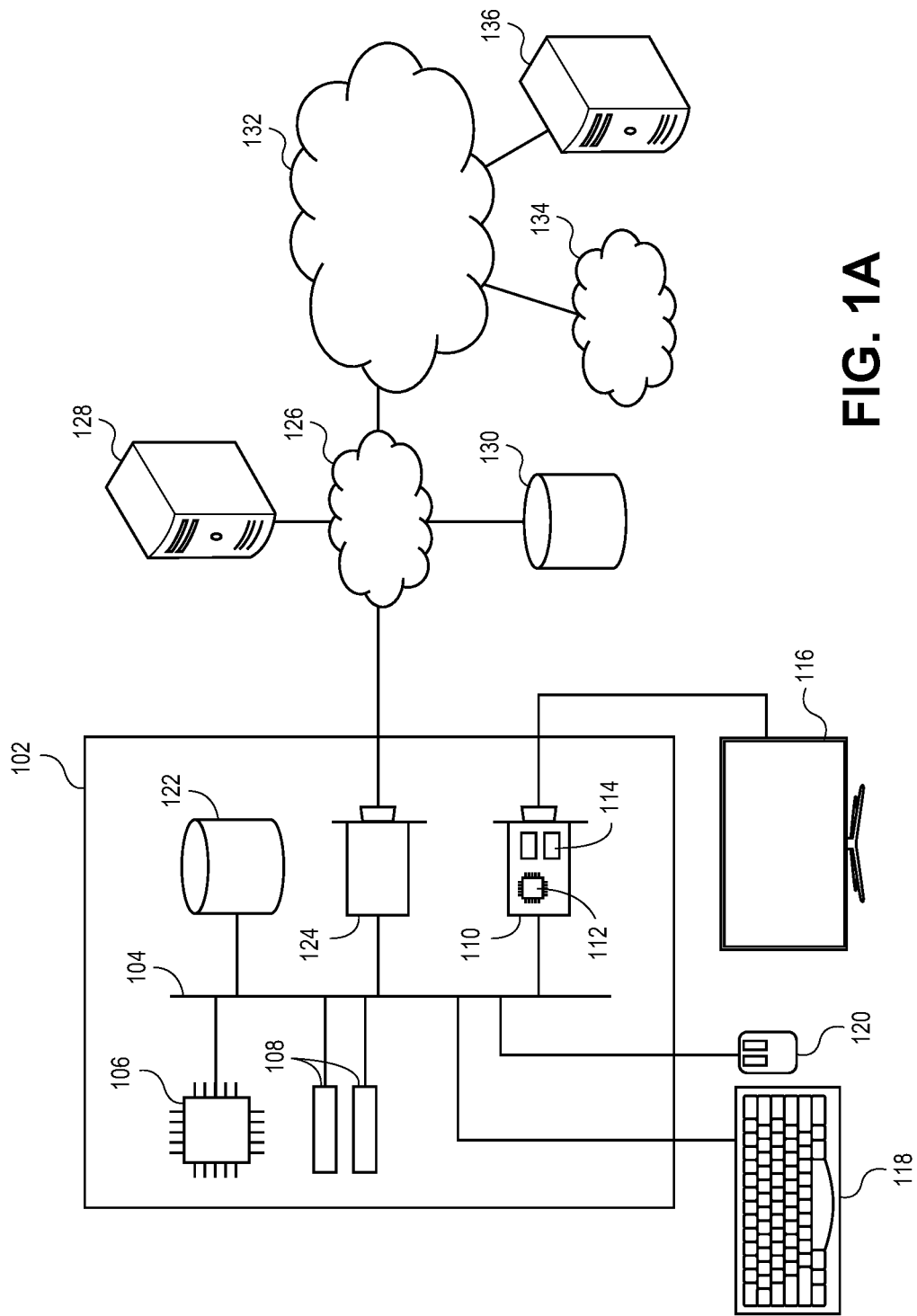
FIG. 1A depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

Context and Concepts of the Invention

As used herein, the term "group-based communication system" refers to a collaborative communication system used within an organization and is distinct from a conventional email or SMS messaging system. In some embodiments, the group-based communication system is a channel-based messaging platform. Within the group-based communication system, communication may be organized into "channels," each dedicated to a particular topic or set of users. Channels are generally long-lasting, persistent discussions of a particular topic. Members of a particular channel can post messages within that channel that are visible to other members of that channel together with other messages in that channel. Users may select a channel for viewing in order to see only those messages relevant to the topic of that channel without seeing messages posted in other channels on different topics. For example, a software development company may have different channels for each software product being developed, where developers working on each particular project can converse without bothering (or being bothered by) developers working on other projects. Because the channels are generally persistent and directed to a particular topic or group, users can quickly and easily refer back to previous communications for reference.

Communication data within a group-based communication system may include messages, queries, files (e.g., documents, spreadsheets, computer code, images, video, audio, and/or electronic contact information), mentions, users or user profiles, interactions (e.g., reactions, edits, deletions, and/or prioritizations such as by pinning or starring), tickets, channels, applications integrated into one or more channels, conversations (e.g., groups of messages that have been segmented as single units), workspaces (e.g., sets of channels, users, projects, tasks within an organization that may have their own sets of permissions and that may be organized substantially in line with an organization chart in some instances) or other data generated by or shared between users of the group-based communication system that are associated with an organization's communication data using the group-based communication system.

In some instances, the communication data may comprise data associated with a user (e.g., a user profile), including, but not limited to, a user identifier, one or more communication channel identifiers associated with communication channels to which the user has been granted access, one or more group identifiers for groups (or organizations, teams, entities, or the like) with which the user is associated, an indication of whether the user is an owner or manager of any communication channels, an indication of whether the user has any communication channel restrictions, a plurality of messages, a plurality of emoji, a plurality of conversations, a plurality of conversation topics, an avatar, an email address, a real name (e.g., Austin Author), a username (e.g., austin_a), a password, a job title, a skill set, user preferences and/or settings, a time zone, a status, a token, and other user-specific information. In some embodiments, the group-based communication system may additionally or alternatively store permissions data associated with permissions of individual users of the group-based communication system. In some embodiments, permissions associated with an individual user can be mapped to, or otherwise associated with, an account or profile associated with user data. Permissions can indicate which users can communicate directly with other users, which channels a user is permitted to access, restrictions on individual channels, which workspaces the user is permitted to access, and restrictions on individual workspaces, for example. In some embodiments, the permissions can support the group-based communication system by maintaining security for limiting access to a defined group of users. In some such embodiments, such users can be defined by common access credentials, group identifiers, or other criteria, as described above.

In some embodiments, the group-based communication system can be partitioned into different workspaces, which can be associated with different groups of users. Each workspace can be associated with a group identifier and one or more user identifiers can be mapped to, or otherwise associated with, the group identifier. Users corresponding to such user identifiers may be referred to as "members" of the group. A workspace may comprise one or more channels that are unique to that workspace and/or one or more channels that are shared between one or more workspaces. In some embodiments, workspaces can be associated with one or more organization identifiers, which can be associated with organizations or other entities associated with the group-based communication system. In some embodiments, such data can be mapped to, or otherwise associated with, other types of data (e.g., user data, permission data, or channel data).

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Operational Environment for Embodiments of the Invention

FIG. 1A illustrates an exemplary hardware platform for certain embodiments of the invention. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses, or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments, no display is present, while in others it is integrated into computer 102. Similarly, peripherals such as keyboard 118 and mouse 120 are connected to system bus 104. Like display 116, these peripherals may be integrated into computer 102 or absent. In some embodiments, additional peripherals such as a microphone or video camera may also be present and connected to system bus 104. In some embodiments, such peripherals may be detachable connected to computer 102 via a wired or wireless connection. In other embodiments, such as a tablet or smartphone, these peripherals are integrated into computer 102. Also connected to system bus 104 is local storage 122, which may be any form of computer-readable media and may be internally installed in computer 102 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write, and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 1B:
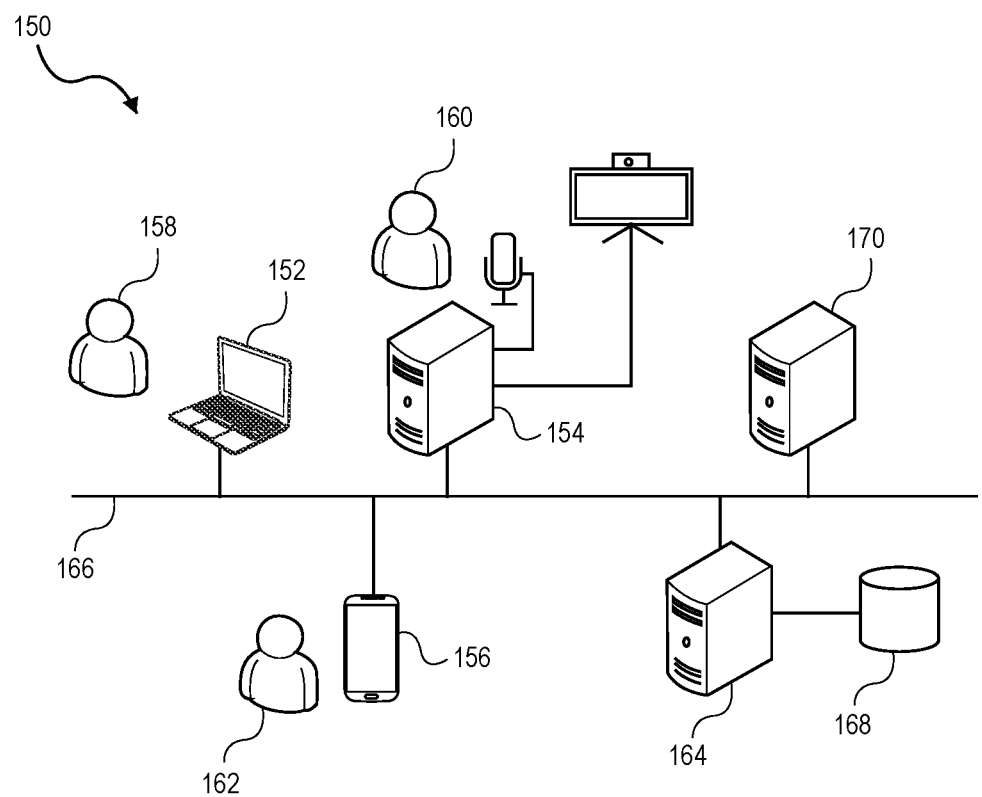
FIG. 1B depicts an exemplary diagram illustrating components of a system for carrying out embodiments of the invention.

FIG. 1B illustrates elements of a system 150 for carrying out embodiments of the invention. System 150 includes any number of client devices such as client device 152, client device 154, and client device 156 associated with user 158, user 160, and user 162 respectively. Although system 150 is depicted with one client device per user, an individual user may connect to the group-based communication system using multiple client devices, either concurrently or sequentially. Similarly, in some embodiments, multiple users may share (concurrently or sequentially) a single client device to access the group-based communication system. As depicted in FIG. 1B, client devices may be any form of computing device discussed above with respect to FIG. 1A. In particular, a user may access the group-based communication system using a desktop, a laptop, or a mobile device. The group-based communication system may be accessible via dedicated software of the client device or via the web browser of the client device. In some embodiments, channel administrators can access administrative functionality via any client device. In other embodiments, administrative functions can only be accessed from a limited subset of client devices (for example, only via client device 152). In some embodiments, the group-based communication system is a channel-based messaging platform.

The group-based communication system is hosted by group-based communication system server 164. Group-based communication system server 164 may be a dedicated server, a shared server, a virtual machine instance in a cloud computing environment, or any other form of computing device discussed above with respect to FIG. 1A. Although a single group-based communication system server 164 is depicted, embodiments with multiple such group-based communication system servers are also contemplated so as to provide scale, redundancy and/or isolation between different instances of the group-based communication system. For example, a software development company may not wish to have its group-based communications system hosted on the same server as a competitor's group-based communication system for security reasons. Group-based communication system server 164 is communicatively coupled to client devices 152, 154, and 156 via network 166. Network 166 may be a local area network (LAN), wide-area network (WAN), virtual private network (VPN) or the Internet. Broadly speaking, any type of network for providing communication between the various components of system 150 is contemplated. Group-based communication system server 164 may provide web server functionality to enable web-based clients and non-web server functionality to enable clients using a dedicated app. Alternatively, both web-based clients and dedicated-app clients might both use a single web server, or the web server might be a gateway providing web-based access to the dedicated-app server. Other techniques for enabling communication among various types of client application are also contemplated.

Group-based communication system data store 168 is communicatively connected to group-based communication system server 164. As depicted, group-based communication system data store 168 is directly connected to group-based communication system server 164; however, any form of communicative connection (for example, network-attached storage (NAS), a network file system (NFS), or cloud-based storage) can be employed. Broadly speaking, group-based communication system data store 168 stores all of the durable information used by group-based communication system server 164. For example, group-based communication system data store 168 may store all of the messages with their associated channels, documents and images uploaded to particular channels, channel membership information, and/or user information. In some embodiments, collaboration sessions may be archived and stored on the group-based communication system data store 168 for subsequent retrieval. As previously discussed, multiple group-based communication system servers may be present in system 150. In such embodiments, each group-based communication system server may have its own copy of group-based communication system data store 168. Alternatively, multiple group-based communication system servers may share a single network-attached group-based communication system data store. Alternatively, or in addition, in any of these embodiments, data may be sharded across multiple group-based communication system data stores.

Real-time media server 170 is also communicatively coupled to group-based communication system server 164 and client devices 152, 154 and 156. Real-time media server manages the multimedia aspects of real-time multimedia collaboration sessions among users of the group-based communication system as described in additional detail below. The term "multimedia" is used in this specification for brevity; however, it should be understood that the term used herein contemplates audio-only streams, video-only streams, audio/video streams, or any other combination of one or more media streams.

As depicted, the communication between real-time media server is via network 166. In some embodiments, however, the real-time nature of collaboration sessions may be better served by connecting via a different network for part or all of the communicative coupling. For example, a particular client device may normally connect to group-based communication system server 164 via a cellular data connection but switch to a WiFi connection when a multimedia collaboration session begins to accommodate an additional demand for bandwidth. In some embodiments, client devices may communicate multimedia collaboration data with each other via real-time media server 170 using a hub-and-spoke configuration. In other embodiments, client devices may communicate with each other directly using a peer-to-peer or supernode architecture. In still other embodiments, client devices on the same network may communicate with each other using multicast network protocols such as IP multicast. In yet other embodiments, media communication between the client devices may be via an edge-based scaling content distribution network.

Figure 2A:
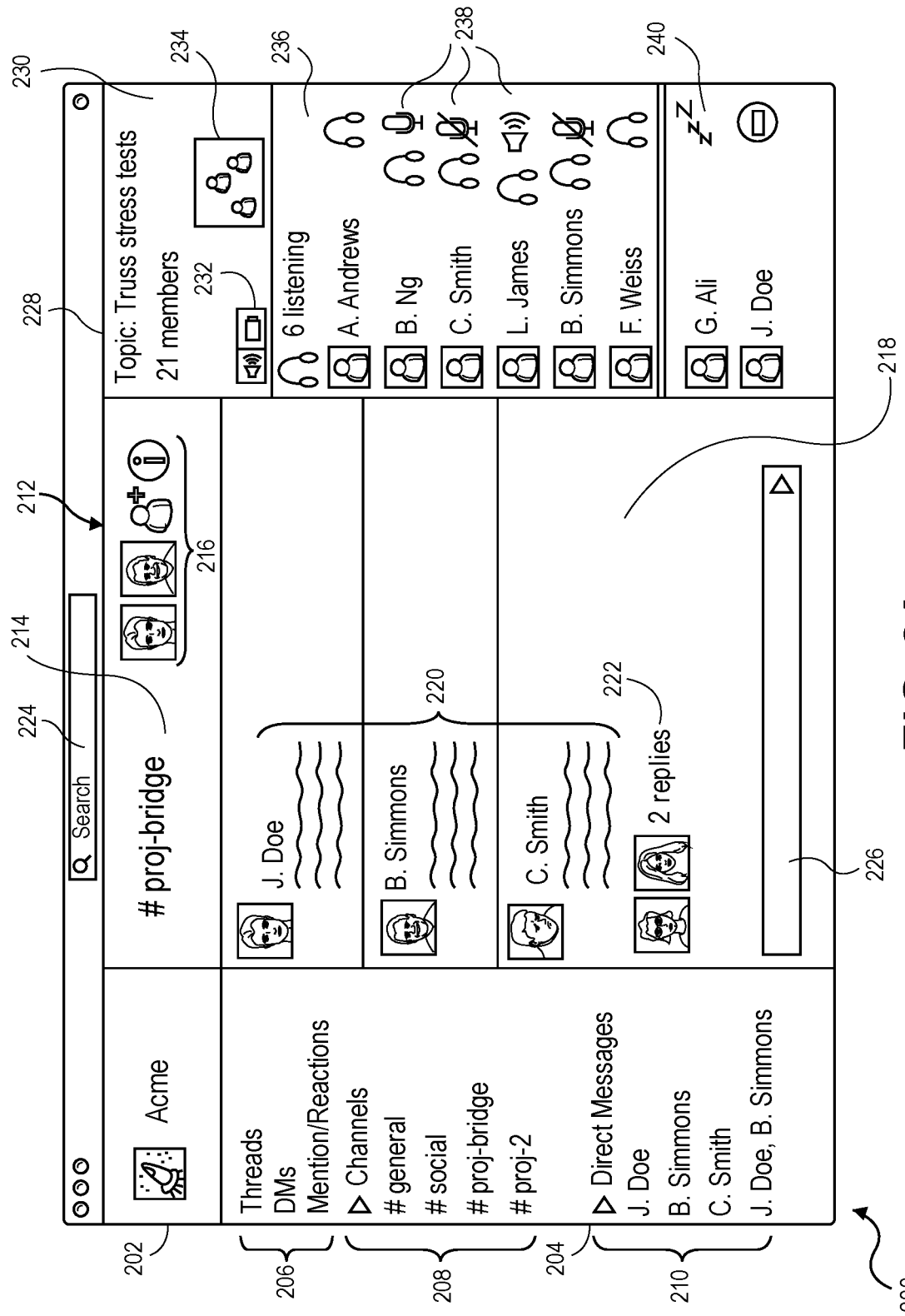
FIG. 2A illustrates a user interface during a live synchronous multimedia collaboration session in a group-based communication system for certain embodiments.

FIG. 2A illustrates a user interface 200 of a group-based communication system, which will be useful in illustrating the operation of various embodiments, as discussed in further detail below. Broadly, user interface 200 comprises a plurality of objects such as panes, text entry fields, buttons, messages, or other user interface components. As depicted, user interface 200 comprises workspace pane 202; channel list pane 204, which comprises quick info list 206, channel list 208 and direct message list 210; channel pane 212, which comprises channel header 214, channel controls 216, channel display 218, messages 220, and thread reply preview 222; search pane 224; compose pane 226; and multimedia collaboration session pane 228.

As depicted, user interface 200 includes workspace pane 202 for navigating between various workspaces in the group-based communication system. In some embodiments, the group-based communication system can be portioned into different workspaces, which can be associated with different groups of users. Each workspace can be associated with a group identifier and one or more user identifiers can be mapped to, or otherwise associated with, the group identifier. Users corresponding to such user identifiers may be referred to as "members" of the group. For example, a user may be a part of a workspace for a job at Acme Civil Engineering. The user may also be a member of a local volunteer organization that also uses the group-based communication system to collaborate. To navigate between the two groups, the user may use workspace pane 202 to change from the Acme workspace to the volunteer organization workspace. A workspace may comprise one or more channels that are unique to that workspace and/or one or more channels that are shared between one or more workspaces. For example, the Acme company may have a workspace for Acme Civil Engineering projects, a workspace for Human Resources, and an additional workspace for general company matters. In some embodiments, workspaces can be associated with one or more organizations or other entities associated with the group-based communication system.

Users may navigate between channels using channel list pane 204. Channel list pane 204 may comprise quick info list 206 comprising various links for a user to quickly access portions of the group-based communication system. For example, as depicted, quick info list 206 comprises threads, Direct Messages (DMs), and mentions/reactions. Each of the items in quick list 206 may be bolded, italicized, highlighted, boxed, animated, or otherwise called out to indicate the presence of unread items or items otherwise of interest. Clicking on the threads link in quick info list 206 may cause the display of all threads in which the user has participated, while clicking on the DMs list may cause the display in user interface 200 of all the direct messages in which the user is involved. Quick info list 206 may be configurable by the user to add various links to areas of the group-based communication system for quick access, such as a link to view all files shared within the group-based communication system. Channel list pane 204 may also comprise channel list 208 listing all channels to which the user has subscribed to or to which the user has been granted access. In some embodiments, channel list pane 204 further includes direct message list 210. Direct message list 210 comprises a list of messages sent from a user directly to another user of the group-based communication system, which may be displayed in channel pane 212 when selected. Direct messages may be sent to one other user or to any number of users.

User interface 200 may further comprise channel pane 212 that displays information related to the currently displayed channel. In some embodiments, within the group-based communication system, communication may be organized into "channels," each channel dedicated to a particular topic or set of users. For example, Acme Civil Engineering company utilizing the group-based communication system may have a channel #general to discuss general company matters and a #proj-bridge channel to discuss a live project. Teams within the civil engineering firm may have their own channels as well, such as a #structural channel for a structural engineering team. Members of a particular channel can post messages within that channel that are visible to other members of that channel together with other messages in that channel. In some embodiments, or for certain selected channels, messages may be visible only to channel members; in other embodiments or for other channels, non-members of a channel may be able to preview messages in a channel without joining. Users may select a channel for viewing in order to see only those messages relevant to the topic of that channel without seeing messages posted in other channels on different topics.

Channel pane 212 may also include channel header 214, which may display metadata for the currently selected channel, including channel name, channel membership, and channel topic. Channel header 214 may also display channel controls 216 for viewing members of the channel, inviting a new member to the channel, viewing information about the channel, or other channel-related functions. User interface 200 may also include search pane 224. Search pane 224 may allow users to search for content located in the current workspace of the group-based communication system, such as files, messages, channels, members, commands, functions, and the like.

As previously mentioned, channel pane 212 may also include compose pane 226. Compose pane 226 allows users to compose and transmit messages to the members of the channel. Compose pane 226 may have text editing functions such as bold, strikethrough, and italicize. Compose pane 226 may also allow users to format their messages or attach files such as, but not limited to, document files, images, videos, or any other files to share the file or files with other members of the channel.

A user may start a synchronous multimedia collaboration session where members of the session may have a verbal discussion. In one embodiment, user interface 200 may comprise multimedia collaboration session pane 228, which comprises multimedia collaboration session header 230, multimedia type control 232, and begin multimedia collaboration session 234. In another embodiment, the synchronous multimedia collaboration session may be started from a channel or a direct message but is not restricted to members of the channel or the direct message. In some embodiments, once the synchronous multimedia collaboration session is active, users outside of the channel or direct message may be invited to join. In some embodiments, multimedia type control 232 allows users to select or change a particular type of multimedia collaboration. For example, a user might be able to select from audio-only, audio/video, screenshare, scratch pad/whiteboard, file share, document collaboration, or any other type of multimedia session. In some embodiments, a "talking heads" multimedia session is available including audio and a small, headshot-only video, image, or animation for the current speaker while non-speaking users may be represented with a profile icon. In some embodiments, multimedia collaboration session pane 228 may be popped out into its own window and overlayed over a portion of user interface 200 (e.g., over messages 220). In some embodiments, multimedia collaboration session pane 228 appears in an always visible section in the sidebar of user interface 200 so that it is accessible regardless of the channel or direct message being displayed in channel display 218. For example, a user may navigate to the #proj-2 channel without leaving the synchronous multimedia collaboration session for the #general channel.

Multimedia collaboration session pane 228 may further display participating members 236 of the live synchronous multimedia collaboration session. When a synchronous multimedia collaboration session is active, the channel members may be divided into participating members 236 and non-participants 240. Participating members 236 may have associated status icons 238 to indicate the status (e.g., muted, video on/off) in which the associated user has joined the synchronous multimedia collaboration session. As illustrated, user J. Doe is a member of the channel #proj-bridge but is a nonparticipant 240 of the current synchronous multimedia collaboration session. As will be described in more detail below, based on a variety of factors related to non-participants 240, the synchronous multimedia collaboration session in the channel #proj-bridge may be surfaced to at least one of the non-participants 240 to notify the at least one nonparticipants 240 that the synchronous multimedia collaboration session is discussing a topic of interest. In some embodiments, topics may be surfaced to non-participants 240 in a virtual multimedia collaboration content hub. The virtual multimedia collaboration content hub may be presented in channel display 218 of user interface 200 and may display a list of recommended synchronous multimedia collaboration sessions as well a other content relevant to the user. The list of recommended synchronous multimedia collaboration sessions may be dynamically updated within the virtual multimedia collaboration content hub based on their relevancy to non-participants 240.

In some embodiments, multimedia collaboration session pane 228 displays a topic for the synchronous multimedia collaboration session. As depicted, the current topic of discussion is "Truss Stress Tests." The topic may be static and configurable by participating members 236 or a subset of participating members 236, such as the creator of the synchronous multimedia collaboration session. In some embodiments, the topic is dynamic and is automatically determined based on the audio data from the synchronous multimedia collaboration session, as will be discussed in further detail below. In some embodiments, information may be shown in multimedia collaboration session pane 228 summarizing the participants in the synchronous multimedia collaboration session. For example, as depicted, the headphones icon shows that six channel members are currently participating in the synchronous multimedia collaboration session. This information may be updated in real time. As depicted, some users have joined the synchronous multimedia collaboration session in send-receive mode (as indicated by the headphones and microphone icon), some users have joined the synchronous multimedia collaboration session in send-receive mode but are muted (as indicated by the headphones and the struck-through microphone) and some users have joined the synchronous multimedia collaboration session in receive-only mode as indicated by the headphones icon with no microphone icon. Additional icons may indicate who is currently speaking (as depicted, the speaker icon). A person of skill in the art, reviewing this disclosure, will appreciate that other icons can be used for other types of synchronous multimedia collaboration sessions and participation (for example, a camera icon for users participating in a video collaboration session or a display icon for users in a screensharing collaboration session). A person of ordinary skill in the art will further appreciate that these icons can be combined to represent the various media streams in a synchronous multimedia collaboration session. For example, one user might be sharing video while other users collaborate on a whiteboard and a third user speaks. Non-joined users may display an icon indicating a reason why they are not joined (for example, if they are away from their computer or busy in a meeting).

In some embodiments, once a synchronous multimedia collaboration session has ended, a summary for the synchronous multimedia collaboration session may be generated. Audio data from each of participating members 236 may be transcribed into a textual transcript of the multimedia collaboration session in real time. In some embodiments, other details from the synchronous multimedia collaboration session may be recorded as well, such as reaction emojis selected by participating members 236. Once transcribed, the summary may be compiled using natural language processing methods, such as extractive and/or abstractive summarization, to analyze the transcript and extract important discussions. In some embodiments, various machine learning methods, such as the TextRank Algorithm, latent semantic analysis, Luhn's summarization algorithm, the KL-Sum algorithm, or a combination thereof may be used for summarizing the transcript. Neural networks such as recurrent neural networks, concurrent neural networks, long short-term memory networks, self-attention models, or generative adversarial networks may be used alone or in conjunction with the above-described methods to determine multimedia collaboration session summaries and/or topics based on the transcribed audio content of the synchronous multimedia collaboration session. In some embodiments, text content from other sources (such as, for example, documents shared or textual messages sent during the synchronous multimedia collaboration session) can be similarly employed to determine synchronous multimedia collaboration session summaries and/or topics. In some embodiments, as a synchronous multimedia collaboration session is in progress, topics and summaries may be extracted based on the audio of the in-progress synchronous multimedia collaboration session and topics may be surfaced to non-participating users based on the audio data of the in-progress synchronous multimedia collaboration session. As the synchronous multimedia collaboration session continues on and additional audio data is received, topics and/or summaries may be updated such that the accuracy of the identified topics and extracted summaries may increase over the course of the multimedia collaboration session.

Summaries for synchronous multimedia collaboration sessions may also be determined in part via input from one or more participating members 236. In some embodiments, the group-based communication system may extract keywords from the audio data of the synchronous multimedia collaboration session and present the keywords to participating members 236 for confirmation that the keywords represent topics discussed during the synchronous multimedia collaboration session. For example, the keywords "building," "bridge," and "trusses" may have been extracted from the multimedia collaboration session illustrated in FIG. 2A. Upon completion of the synchronous multimedia collaboration session, the keywords may be presented to participating members 236 via user interface 200 for confirmation that the keywords represent topics of the synchronous multimedia collaboration session. Participating members 236 may select "bridge" and "trusses" but not "building," thus indicating that bridge and trusses were relevant topics for the meeting, but building was not a relevant topic despite the word "building" being an extracted keyword for the synchronous multimedia collaboration session.

Transcribed synchronous multimedia collaboration sessions may then become associated with the channel in which the synchronous multimedia collaboration session originated. Thus, past synchronous multimedia collaboration sessions may become searchable, via the transcripts, within channels and direct messages. Transcribed past synchronous multimedia collaboration sessions may prove beneficial when onboarding new members to an organization, providing new employees easily searchable and reviewable meetings.

In some embodiments, participating members 236 may react to the speaker by selecting an emoji in real time. In some embodiments, the selected emojis are displayed next to the speaker's icon or the reacting user's icon. In some embodiments, the selected emojis are ephemeral and disappear once displayed in multimedia collaboration session pane 228 for a predetermined period of time. In some embodiments, the selected emoji is displayed next to the appropriate user's icon.

Figure 2B:
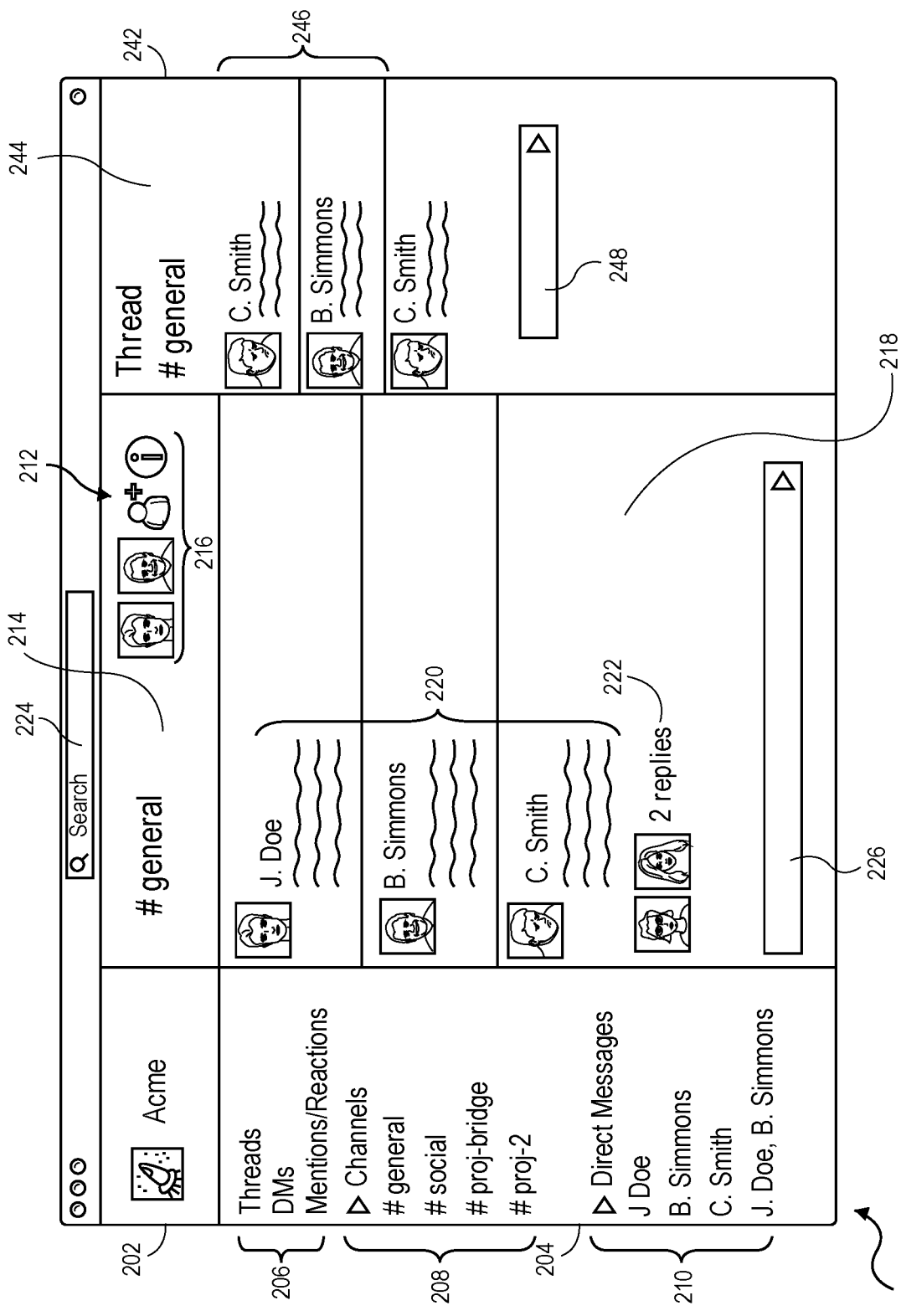
FIG. 2B illustrates a user interface for the group-based communication system for certain embodiments.

FIG. 2B, by contrast, illustrates user interface 200 when the user is not participating in a synchronous multimedia collaboration session for certain embodiments. Where common features or elements are unchanged, they are not discussed separately from their description with respect to FIG. 2A. As illustrated, multimedia collaboration session pane 228 has been replaced with thread pane 242. In some embodiments, conversations in channels may further be broken out into threads. Threads may be used to aggregate messages related to a particular conversation together to make the conversation easier to follow to and reply to. For example, a user, C. Smith, in the channel #general may ask a question pertaining to a specific company policy. Another member of the channel may decide to reply to C. Smith in a thread to keep the conversation grouped together and to keep the response from getting lost in the channel. Under the message to which a user has replied appears thread reply preview 222. Thread reply preview 222 may show information related to the thread, such as, for example, the number of replies and the members who have replied. Thread replies may appear in thread pane 242 that may be separate from channel display 218 in channel pane 212 and may be viewed by other members of the channel by selecting thread reply preview 222 in channel display 218.

In some embodiments, thread pane 242 comprises thread header 244 that may display the channel the thread is associated with. Thread pane 242 also may include scrollable thread display 246 that displays each message sent in the history of the thread. Users participating in the thread may also reply directly to the thread using thread compose pane 248. Thread compose pane 248 may be positioned within thread pane 242 where a user can compose and transmit a reply to the messages in the thread.

Figure 2C:
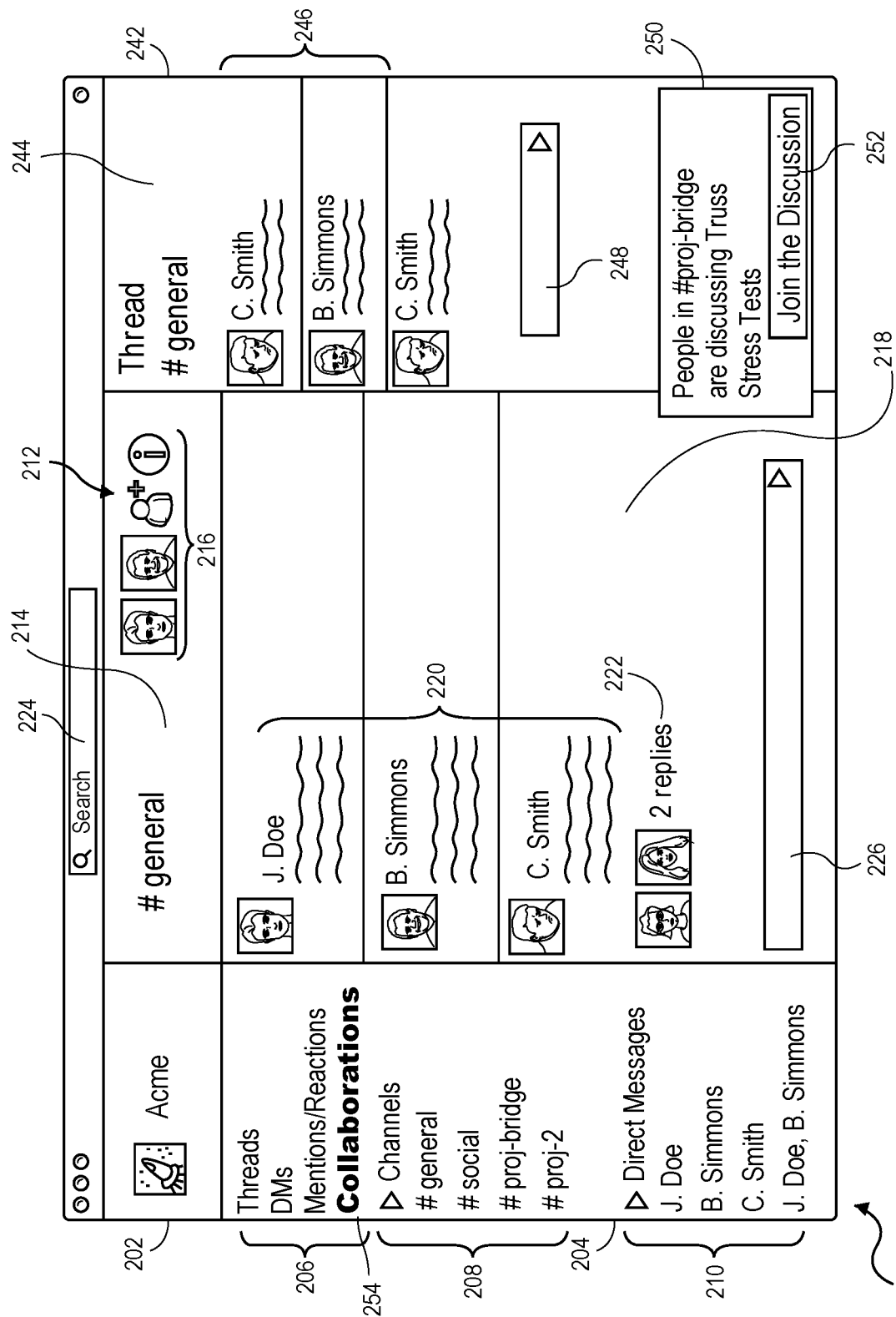
FIG. 2C illustrates a user interface in which relevant topics of the multimedia collaboration session have been surfaced to a non-participating member in the group-based communication system.

FIG. 2C illustrates user interface 200 in which relevant topics for live synchronous multimedia collaboration sessions have been surfaced to an identified nonparticipating member having an interest in the relevant topics associated with the synchronous multimedia collaboration session. Where common features or elements are unchanged, they are not discussed separately from their description with respect to FIG. 2A and FIG. 2B. Two variations of surfacing topics to users are illustrated in FIG. 2C, although FIG. 2C is not meant to be limiting in the way in which topics may be surfaced. In some embodiments, notification pop-up 250 comprises a notification to the nonparticipating member of a potentially relevant synchronous multimedia collaboration session. Notification pop-up 250 also comprises join button 252 that may be actuated by the non-participating member to join the synchronous multimedia collaboration session. Notification pop-up 250 may comprise other options for responding to the notification, such as a dismiss option, a snooze option, and the like. In some embodiments, notification pop-up 250 is presented via computer 102 when the group-based communication system is minimized or not focused on by the user. Notification pop-up 250 may also be sent to a mobile device associated with the user running a mobile version of the group-based communication system via, for example, a push notification.

Another way in which non-participating members may be notified of relevant topics is collaborations hub 254. In some embodiments, collaborations hub 254 is displayed with the items in quick info list 206. Collaborations hub 254 may be bolded, italicized, highlighted, boxed, animated, or otherwise called out to the non-participating member when a synchronous multimedia collaboration session with a relevant topic is identified for the non-participating member. For example, as depicted, collaborations hub 254 is balded to notify the user that a relevant discussion is live. Selecting collaborations hub 254 may auto-join the non-participating member directly to the relevant synchronous multimedia collaboration session. In the case where multiple live synchronous multimedia collaboration sessions are of relevance to the on-participating user, selecting collaborations hub 254 may display all of (or a subset of) the relevant synchronous multimedia collaboration sessions. In the event the user does not join an active collaboration before it ends, collaborations hub 254 may also provide links to completed synchronous multimedia collaboration sessions and provide an audio recording, summary, or transcript of the synchronous multimedia collaboration session. Various other methods of surfacing relevant synchronous multimedia collaboration sessions to non-participating members are considered herein. For example, an audio cue may play when a relevant synchronous multimedia collaboration session is found. As another example, the channel or direct message with which the synchronous multimedia collaboration session is associated with may be bolded, italicized, highlighted, boxed, animated, or otherwise called out in channel list 208 or direct message list 210. For example, the channel #proj-bridge may be bolded when it is determined that a relevant topic to J. Doe is being discussed.

Figure 3:
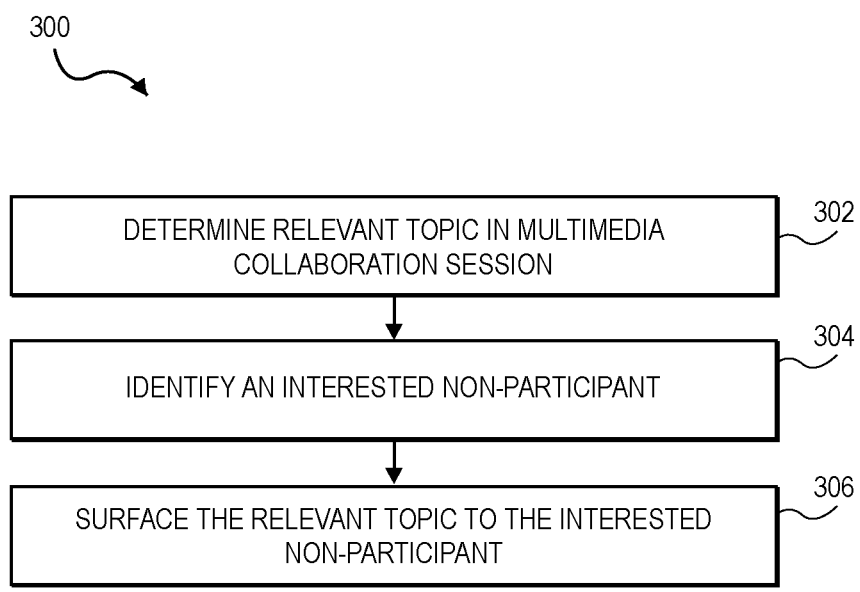
FIG. 3 illustrates an exemplary method of notifying the non-participating member of a topic of interest discussed in the multimedia collaboration session in a group-based communication system.

FIG. 3 illustrates a method 300 of notifying a non-participating member of a synchronous multimedia collaboration session in which a topic being discussed may be of interest to the non-participating member. At step 302, a relevant topic or relevant topics for the synchronous multimedia collaboration session may be determined. In some embodiments, the synchronous multimedia collaboration session is an live, synchronous multimedia collaboration session. As used herein, the term "synchronous multimedia" refers to the real-time or substantially real-time exchange of multimedia content among participating members 236 of the synchronous multimedia collaboration session. Examples of synchronous multimedia include voice and video calls, streaming screen sharing, and collaborative whiteboarding or scratch padding. In contrast, examples of asynchronous multimedia include previously recorded content such as recorded video or podcasts that users may access at any point in time after the content has been recorded or posted. In some embodiments, the relevant topic is determined after a synchronous multimedia collaboration session has been completed. As further detailed below, the determination of relevant topics and the surfacing of the relevant topics to interested users is not limited to synchronous multimedia collaboration sessions and may instead be determined from channels, threads, direct messages, or any other area of the group-based communication system.

The relevant topic for the synchronous multimedia collaboration session may be determined in various ways. In some embodiments, the relevant topic is determined by analyzing the audio data associated with the synchronous multimedia collaboration session. In some embodiments, analyzing the audio data may be done in real-time as the synchronous multimedia collaboration session is active and/or may be done using a recorded audio file of the synchronous multimedia collaboration session once it has concluded. A transcript may be generated by analyzing the audio and converting speech-to-text using various speech recognition techniques, such as hidden Markov models or end-to-end automatic speech recognition.

From the generated transcript, relevant topics may be extracted. In some embodiments, keywords from the transcript may be identified. As used herein, a keyword is a word or a phrase relating to a topic and (alone or in combination with other keywords) identifying that topic. Keywords may be project names, key phrases related to the project, topics, or the like. A keyword may represent the relevant topic, or the combination of multiple extracted keywords may represent the relevant topic. In some embodiments, keywords may be configured by users such that the users are notified when the keyword is identified within a synchronous multimedia collaboration session or a channel of the group-based communication system. Keywords may also be extracted using various natural language processing methods. For example, keywords may be determined using topic segmentation methods such as hidden Markov models, lexical chains, cooccurrence, clustering, topic modeling, or a combination thereof.

In some embodiments, there may be a threshold of keyword identifications that must be met before the keyword is considered to be a relevant topic for the synchronous multimedia collaboration session. For example, there may be a minimum of five or ten mentions of the keyword in the synchronous multimedia collaboration session before it is considered to be the relevant topic. In such a way, one-off mentions of a keyword or a quick side discussion related to the keyword does not cause the keyword to be erroneously identified as a relevant topic of the synchronous multimedia collaboration session. In some embodiments, the threshold may have an associated time constraint that must be met for the keyword to be considered the relevant topic. For example, the keyword may have a threshold of five mentions that also occur within ten minutes. Repeated mentions of the keyword within a smaller time frame may be further indicative that the keyword represents a relevant topic.

In some embodiments, more than one keyword must be identified to be considered a relevant topic. For example, if J. Doe is interested in bridge truss stress tests, then it may be required that both the keyword "bridge" and the keyword of "finite element analysis" be identified for J. Doe to be notified of the synchronous multimedia collaboration session. Similarly, the detection of multiple keywords may have to meet a threshold and/or a time constraint in order to be considered a relevant topic. In some embodiments, the threshold for multiple keywords may be lower than for detection of a single keyword because it is more likely that multiple keywords in a synchronous multimedia collaboration session represent a relevant topic for the non-participating member.

In some embodiments, the distance between repeated keyword mentions or between the mentions of two distinct keywords may be utilized to determine a relevant topic. Continuing with the above example, the determination that the relevant topic of the synchronous multimedia collaboration session is finite element analysis for the bridge may require both "bridge" and "finite element analysis" to be mentioned with 10, 50, or 100 words of one another. Broadly, the repetition of keywords, the time between keywords, and the distance between keywords, or a combination thereof may be leveraged to determine relevant topics.

Relevant topics may also be extracted using various non-audio information within or outside of the synchronous multimedia collaboration session. In some embodiments, participating members 236 (e.g., the creator of the multimedia collaboration session) may set a title or a description of the synchronous multimedia collaboration session, and the relevant topic may be determined by analyzing the title or description of the synchronous multimedia collaboration session. In some embodiments, the non-audio content of a synchronous multimedia collaboration session may be used to determine its topic. For example, a title of a presentation may provide useful information on the content of a synchronous multimedia collaboration session without requiring a user to manually specify a topic. In some embodiments, participating members 236 are asked to provide (or confirm) a summary after the synchronous multimedia collaboration session ends, as described above. Relevant keywords from the synchronous multimedia collaboration session may be extracted and presented to participating members 236 for confirmation the relevant keywords represent the relevant topic for the synchronous multimedia collaboration session, as described above. Additionally, or alternatively, participating members 236 may write or dictate a summary for the synchronous multimedia collaboration session which may be used to determine the topic or topics of the multimedia collaboration session.

In some embodiments, participating members 236 of the synchronous multimedia collaboration session themselves may be used to determine the relevant topic. The history of the user interacting with participating members 236 of the synchronous multimedia collaboration session may be analyzed to determine if the synchronous multimedia collaboration session may be discussing a topic relevant to the user. For example, if the non-participant and at least a subset of participating members 236 of the synchronous multimedia collaboration session are in multiple channels together within the group-based communication system, the presence of participating members 236 in the synchronous multimedia collaboration session may be used as an indication the synchronous multimedia collaboration session is relevant to the user. As another example, participating members 236 who have recently interacted with the nonparticipant may be used to determine that a synchronous multimedia collaboration session is relevant to the non-participant. Interactions between members may comprise thread replies, direct messages, mentions, reactions, and the like.

In some embodiments, synchronous multimedia collaboration sessions are surfaced to non-participating members without a determination of a relevant topic. Within the group-based communication system, the non-participating member may be associated with various coworkers. If all or a threshold number of the non-participating member's coworkers are in a synchronous multimedia collaboration session, the synchronous multimedia collaboration session may be surfaced because it is likely that the non-participating member's coworkers are discussing a topic relevant to the nonparticipating member, even if a relevant topic has yet to be extracted for the synchronous multimedia collaboration session.

As another example, the user may have direct messages between one or more of participating members 236 indicating the user likely works closely with participating members 236 and that the synchronous multimedia collaboration session may be of relevance to the user. For example, as shown in FIG. 2B, user J. Doe has multiple direct messages with user B. Simmons. As such, relevant topics in a synchronous multimedia collaboration session in which B. Simmons is a participating member 236 may be more likely to be surfaced to J. Doe. In some embodiments, the presence of relevant participating members 236 may change the threshold for keywords to be determined to be a relevant topic. Consider, for example, a scenario where J. Doe and B. Simmons are both structural engineers working on the same bridge design. J. Doe and B. Simmons may also be in shared channels, such as #structural and #proj-bridge. As described above, the keyword "bridge stress" is a determined relevant topic for J. Doe. Based on B. Simmons being in a synchronous multimedia collaboration session within the channel #proj-bridge, the threshold for the keyword "bridge stress" may be lowered because it is more likely that the keyword represents the relevant topic for the synchronous multimedia collaboration session because of B. Simmons's participation in the synchronous multimedia collaboration session. As such, J. Doe may be more quickly notified that the synchronous multimedia collaboration session is discussing a topic of interest. As yet another example, user B. Simmons may also have the keyword "bridge stress" defined as a topic of interest. Thus, the criteria for surfacing the relevant topic may be lessened because of the inclusion of the similar user, B. Simmons, and the shared topic of interest between B. Simmons and J. Doe. Broadly, any interaction between the non-participating member and participating members 236 of the synchronous multimedia collaboration session within the group-based communication system may be leveraged to help identify if the synchronous multimedia collaboration session may comprise a relevant topic to the non-participating member.

Analyzing the history and activity of the non-participating member within the group-based communication system may be done in conjunction with keyword extraction from the audio of the synchronous multimedia collaboration session. For example, if a keyword extracted from the audio of the multimedia collaboration session is also present in a direct message between the user and a participating member 236 (e.g., B. Simmons) of the synchronous multimedia collaboration session, this may cause the relevant topic to be surfaced to the user. Like the above-described example, the presence of the keyword in areas of the group-based communication system outside of the synchronous multimedia collaboration session may cause a threshold for surfacing the relevant topic to the non-participating member to be lowered. Similarly, past synchronous multimedia collaboration sessions in which the non-participating member has participated in may be examined to determine relevant topics. If the non-participating member has participated in multiple synchronous multimedia collaboration sessions within the channel #proj-bridge within the past week, a new synchronous multimedia collaboration session within #proj-bridge may be more likely to be surfaced to the user. While synchronous multimedia collaboration sessions are typically created as ad hoc collaboration sessions, synchronous multimedia collaboration sessions may be scheduled to recur on a specified basis. As such, if a user has participated in a number of recurring synchronous multimedia collaboration sessions but is not present in a live iteration of a recurring synchronous multimedia collaboration session, the live, recurring synchronous multimedia collaboration session may be surfaced to the non-participating member because it is likely that the non-participating member has an interest in the meeting based on the nonparticipating member's attendance at the previous meetings.

As described above, non-audio data within the synchronous multimedia collaboration session may be utilized to determine the relevant topic for the synchronous multimedia collaboration session. In some embodiments, the synchronous multimedia collaboration session can be initiated as an audio-video session where members can provide video such as via a screen-share and collaboratively work on documents in the synchronous multimedia collaboration session. As such, in some embodiments, the video of a synchronous multimedia collaboration session may also be used to identify relevant topics for the synchronous multimedia collaboration session. For example, a participating member may be giving a presentation to the other participating members and sharing the presentation via the synchronous multimedia collaboration session. In this case, the title or other text in the shared presentation may be analyzed for identifying the relevant topic. For example, if the title of the presentation is "Theoretical Bridge Stresses," the synchronous multimedia collaboration session may be surfaced to J. Doe. As another example, two participating members may be collaboratively working on a project in a text editing document or a PDF file which may comprise text throughout. The text in the shared document may also be analyzed for potentially relevant topics.

As another example, as described above, synchronous multimedia collaboration sessions often originate from channels within the group-based communication system. Channels may have a set topic or description to provide information relating to the channel. For example, the channel #social may have a description "A place to discuss all social aspects of work." Thus, a synchronous multimedia collaboration session created within the #social channel may be more likely to discuss social events, such as a happy hour or a company outing. In such a way, potentially relevant topics can be weighted more heavily before keyword extraction is performed via the audio data of the synchronous multimedia collaboration session based on auxiliary data found throughout the group-based communication system.

At step 304, the group-based communication system may identify an interested non-participant of the synchronous multimedia collaboration session with an interest in the relevant topic identified at step 302. The interested non-participant may be identified based on a list of known topics of interest associated with the user. As described above, learning topics of interest for a user in the group-based communication system may be done in various ways. Broadly, any activity taken by the non-participating member within the group-based communication system may be analyzed to help determine topics of interest for the user.

Historic, recent, or frequent user interaction within the group-based communication system and/or similarity between users such as determining that a user shares common membership in channels with users may be used.

In some embodiments, a potentially relevant keyword or topic is suggested to the user via the user interface of the group-based communication system such that the user can confirm or deny that the keyword is of interest. For example, based on various factors related to the user, such as the user's job title and a list of channels the user participates in, the user may be suggested a keyword. For example, J. Doe may post various messages in the channel #proj-bridge relating to traffic loading, bridges, and stresses. J. Doe may also be a member of channels #structural and #bridge. Further, J. Doe may also have a set job title within the group-based communication system, such as Bridge Engineer. Based on any or a combination of the above factors, the group-based communication system may suggest to J. Doe that the keyword "bridge" is a relevant topic. J. Doe may then be prompted to confirm interest in the keyword. If the user confirms their interest in the suggested keyword, the user may then be notified when the keyword is determined to be a topic of interest in a synchronous multimedia collaboration session. In some embodiments, the user can edit the suggested keyword. For example, J. Doe may decide that "bridge" is too broad of a keyword and may edit the keyword to be "bridge stress" instead. In some embodiments, users may also configure the thresholds and other criteria for being surfaced a relevant synchronous multimedia collaboration session.

As another example, any messages sent by the non-participating member within the group-based communication system may be analyzed using natural language processing methods to extract relevant topics. For example, if the user is often posting about the Project Bridge it may be determined that the keyword "Project Bridge" is of interest to the user. As another example, the user may "react" to messages posted by other users in the group-based communication system. The reactions may be in the form of emojis that can be actuated on a message in the group-based communication system, as described above. For example, an eyeball emoji may be used to indicate that a user has seen a posted message. Consequently, if the user often reacts to messages containing a specific keyword, such as bridge stresses, the group-based communication system may infer that that specific keyword is of interest to the user. In some embodiments, specific topics, such as a project, may have defined reaction emojis. For example, a bridge emoji may be used to react to messages that have relevance to Project Bridge. By analyzing messages and any reaction emojis applied to the messages, topics of interest may be determined. As such, relevant topics may be identified without the user specifically discussing the topic.

As described above, the user may have a user profile in the group-based communication system. The user profile may comprise a job title, a skill set, a location, or various other user-related information. If the user's job title is Bridge Engineer, the group-based communication system may infer that keywords and phrases such as bridge stresses or vehicle load are of relevance to the user. The group-based communication system may then present these to the user for confirmation that the user wishes to be notified when the keywords are identified in a synchronous multimedia collaboration session.

The user may also be associated with a location which may be used as a potentially relevant topic. For example, the user may be on-site at the bridge-building site in St. Louis.

As such, the phrase St. Louis may be determined to be a topic of interest. If the user moves to a new job site, such as Chicago, the group-based communication system may determine that St. Louis is no longer of interest to the user but Chicago likely is. Any synchronous multimedia collaboration session discussing Chicago may then be surfaced to the user as a relevant synchronous multimedia collaboration session. In some embodiments, the location for the user is set by the user within the group-based communication system. In some embodiments, the location for the user is determined via a mobile device associated with the user, using a GPS or other location sensor.

In some embodiments, an interested non-participant may not be identified based on an access or privacy level associated with the synchronous multimedia collaboration session. In some embodiments, members of the group-based communication system may be organized hierarchically. As such, a synchronous multimedia collaboration session with a relevant topic may only be surfaced to members who meet a threshold within the hierarchy. In some embodiments, the threshold may be the hierarchical level of the lowest member in the hierarchy present in the synchronous multimedia collaboration session. For example, if a synchronous multimedia collaboration session comprises the CEO of the civil engineering firm and executives just below the CEO, only other executives not in the synchronous multimedia collaboration session may be identified as having a relevant interest in the synchronous multimedia collaboration session. Similarly, if the synchronous multimedia collaboration session is taking place within a direct message, group-based communication members who are not a part of the direct message may not be identified as non-participating members having a relevant interest even if the topic of the synchronous multimedia collaboration session within the direct message is relevant to the user.

User participation within channels of the group-based communication system may also be leveraged when identifying users to surface synchronous multimedia collaboration session recommendations. For example, a synchronous multimedia collaboration session may be live in the #proj-2 channel discussing bridge stresses. While user J. Doe is a member of the channel #proj-2, J. Doe may have never participated or have only infrequently participated in the channel #proj-2. As such, surfacing the synchronous multimedia collaboration session to J. Doe may require a stronger indication that the synchronous multimedia collaboration session is relevant to J. Doe, such as a higher keyword threshold and the presence of more than one participating members 236 who are on the same team as J. Doe.

Relevancy scores may be calculated for non-participating members when identifying relevant topics. In some embodiments, the relevancy score for a topic is based on an amount of topic mentions or interactions the user has for that topic. For example, if J. Doe has one hundred instances of discussing bridge stresses and only ten instances of discussing traffic load, the relevancy score for bridge stresses would be higher than that for traffic load. Similarly, participation levels, such as a number of past synchronous multimedia collaboration sessions in which a user has participated may factor into relevancy scores. In some embodiments, reaction emojis may factor into determination of relevancy scores. If a user often reacts to messages discussing a certain topic, this may be indicative of the message topic being relevant to the user. Various interactions within the group-based communication system may be weighted differently when determining relevancy scores. For example, the non-participating user posting a message about the relevant topic may be weighted heavier than the non-participating user using a reaction emoji to a post about the relevant topic. The relevancy scores may be dynamic and change based on user activity. In some embodiments, the most recent activity taken by a user is weighted heaviest when determining relevancy scores.

In some embodiments, skill graphs and/or topic graphs may be created for users when determining topics of interest. Skill graphs may be determined in part based on the skill set associated with the user profile, the job title, or keywords determined to be relevant to the user. Skills may be mapped to various channels and users within the group-based communication system. For example, users having skills related to structural engineering may be mapped to the channels #structural and #proj-bridge. Similarly, users sharing the same job title (e.g., civil engineer) may have skills mapped to one another. Topic graphs may also be generated for users to map topics of interest for users to various portions of the group-based communication system. For example, the topic "bridge stresses" may be mapped to the channel #proj-bridge upon determination that bridge stresses is an often-discussed topic in the channel.

Next, at step 306, the relevant topic may be surfaced to the user. Surfacing the topic may be done to encourage the user to join the synchronous multimedia collaboration session. Surfacing the topic may be done in various ways, as described above. In some embodiments, the way in which the topic is surfaced the user may be configurable by the user. Notification pop-ups 250 via user interface 200 and/or via computer 102 may be utilized to notify the non-participating member. Quick info list 206 may be updated with collaborations hub 254 to recommend synchronous multimedia collaboration sessions to users. Other surfacing methods may include an audio cue or the like as described above. The topic may also be surfaced to the non-participating user with contextual data associated with the live synchronous multimedia collaboration session. In some embodiments, the contextual data comprises the channel or direct message that the synchronous multimedia collaboration session is associated with. In some embodiments, the contextual data comprises the list of participating members 236 of the live synchronous multimedia collaboration session or a list of participating members 236 determined to be relevant or associated with the non-participating user. In still other embodiments, the contextual data comprises a summary of the live synchronous multimedia collaboration session.

In some embodiments, the relevant topic is recommended to the user once the synchronous multimedia collaboration session has concluded. For example, the user may have been on vacation. When the user returns and logs back into the group-based communication system, the user may be notified that the user missed five synchronous multimedia collaboration sessions in which the keyword phrase bridge stresses was discussed. The relevant topic may be surfaced via the above-described methods and may comprise options to play back a recording of the synchronous multimedia collaboration sessions or to review a transcript of the audio from the synchronous multimedia collaboration sessions. When the relevant topic is surfaced after the conclusion of a synchronous multimedia collaboration session, the surfacing of the relevant topic may also comprise indications of when the topic was discussed. For example, each mention of a keyword in a synchronous multimedia collaboration session may be timestamped. As such, the surfacing may comprise an indication such as, "The keyword 'bridge stresses' was first mentioned at 9:23 of the synchronous multimedia collaboration session." Similarly, the surfacing may comprise a time range indicative of a first and last mention of the keyword, or a subset of mentions of the keyword. In some embodiments, when a transcript is provided, the keywords in the transcript are automatically highlighted or otherwise called out to the user.

When multiple synchronous multimedia collaboration sessions are identified as being of relevance to a non-participating member, the presentation or ordering of recommending of the synchronous multimedia collaboration sessions to the non-participating member may be based on a ranking of the relevancy of topics. For example, consider a case where three synchronous multimedia collaboration sessions are live, with one synchronous multimedia collaboration session discussing "buildings," a second synchronous multimedia collaboration session discussing "bridge stresses" and a third synchronous multimedia collaboration session discussing "vehicle loads." Based on the activity of the non-participating member, the surfacing of each of the synchronous multimedia collaboration sessions may vary. For example, the group-based communication system may have learned, based on the activity of J. Doe within the group-based communication system, that bridge stresses are the highest topic of interest for J. Doe. This may be based on the calculated relevancy score, for example. As such, the synchronous multimedia collaboration session discussing bridge stresses may be surfaced to J. Doe via notification pop-up 250, while the other two synchronous multimedia collaboration sessions may be surfaced only via collaborations hub 254. In some embodiments, synchronous multimedia collaboration sessions are surfaced in the same way regardless of a level of relevancy to the non-participating member.

The above-described methods of topic determination and surfacing the topic to an interested non-participant are not limited to topics discussed only in synchronous multimedia collaboration sessions. Rather, topics discussed throughout the group-based communication system, such as in channels, direct messages, or threads, may be determined and surfaced to relevant users. As described above, the group-based communication system comprises a plurality of channels, with each channel typically dedicated to a single topic (e.g., a project). Group-based communication system users may be members of tens or hundreds of channels within the group-based communication system, and it may be difficult for users to monitor conversations happening in all of the channels. By analyzing channel messages, react emojis, user participation and the like throughout the group-based communication system, non-participating members may be notified when relevant topics are discussed. As an example, J. Doe may also be a member of a channel #test-reports where test reports, such as computer simulations, are shared. If a file is shared within #test-reports that relates to a topic of interest for J. Doe, the channel may be surfaced to J. Doe. For example, a file entitled bridge_stress_FEA_results, or a file shared by a relevant team member of J. Doe (e.g., B. Simmons) may result in the channel being surfaced to J. Doe.

Although the invention has been described with reference to the embodiments illustrated in the attached drawing figures, it is noted that equivalents may be employed and substitutions made herein without departing from the scope of the invention as recited in the claims.

What is claimed is:

1. One or more non-transitory computer-readable media storing computer-executable instructions that, when executed by at least one processor, cause the at least one processor to perform operations comprising:

determining at least one of audio data representing a discussion occurring within an unscheduled synchronous multimedia collaboration session associated with a group-based communication system or non-audio data representing at least one of the discussion, a description of the unscheduled synchronous multimedia collaboration session, or a title of the unscheduled synchronous multimedia collaboration session;

determining, based at least in part on the at least one of the audio data or the non-audio data, a topic discussed in the unscheduled synchronous multimedia collaboration session;

determining data associated with a participating member of participating members of the unscheduled synchronous multimedia collaboration session and at least one non-participating member of the unscheduled synchronous multimedia collaboration session, the data including at least one of messages exchanged between the participating member and the at least one non-participating member, the participating member and the at least one non-participating member both being members of a same virtual space of the group-based communication system, or the participating member and the at least one non-participating member both being included in a same group;

determining, based at least in part on the data, that the at least one non-participating member is likely to be interested in the topic based at least in part on at least one of member data associated with the at least one non-participating member or channel content of at least one group-based communication channel, in which the at least one non-participating member is a member, of a plurality of group-based communication channels of the group-based communication system; and causing display, to the at least one non-participating member and via a user interface of the group-based communication system, of at least one of the unscheduled synchronous multimedia collaboration session or a list of recommended synchronous multimedia collaboration sessions that are determined to be related to at least one of the topic or the unscheduled synchronous multimedia collaboration session.

2. The one or more non-transitory computer-readable media as recited in claim 1, wherein determining the topic further comprises:

determining, during the unscheduled synchronous multimedia collaboration session, the audio data associated with the participating members;

determining, based at least in part on the audio data, one or more keywords words uttered by at least one participating member of the participating members;

presenting at least one keyword of the one or more keywords to at least one participating member of the participating members;

receiving, from the at least one participating member, a confirmation that the at least one keywords is representative of the topic; and determining the topic based at least in part on the one or more keywords and the confirmation.

3. The one or more non-transitory computer-readable media as recited in claim 2, wherein the operations further comprise:

transcribing the audio data into textual data;

identifying the one or more keywords from the textual data; and comparing the one or more keywords to a plurality of keywords and a plurality of topics maintained by the group-based communication system.

4. The one or more non-transitory computer-readable media as recited in claim 1, wherein the at least one non-participating member is a non-member of a group-based communication channel in which the unscheduled synchronous multimedia collaboration session was initiated.

5. The one or more non-transitory computer-readable media as recited in claim 1, wherein the operations further comprise:
   determining a summary of the unscheduled synchronous multimedia collaboration session based at least in part on the audio data; and
   causing display, to the at least one non-participating member and via the user interface, of the summary with the unscheduled synchronous multimedia collaboration session.

6. The one or more non-transitory computer-readable media as recited in claim 1, wherein the operations further comprise:
   determining a summary of the unscheduled synchronous multimedia collaboration session based at least in part on the audio data; and
   causing display, to the at least one non-participating member and via the user interface, of the summary with the list of recommended synchronous multimedia collaboration sessions.

7. The one or more non-transitory computer-readable media as recited in claim 1, wherein determining the topic comprises:
   determining a threshold corresponding to a number of instances of a keyword that is to occur within synchronous multimedia collaboration sessions in order for the topic to be identified for the unscheduled synchronous multimedia collaboration session;
   determining one or more keywords words uttered by at least one participating member of a plurality of participating members of the unscheduled synchronous multimedia collaboration session;
   determining that the one or more keywords meet or exceed the threshold; and
   determining the topic in response to determining that the one or more keywords meet or exceed the threshold.

8. The one or more non-transitory computer-readable media as recited in claim 7, wherein at least one of:
   the number of instances of the keyword is to occur within a threshold amount of time in order for the topic to be identified for the unscheduled synchronous multimedia collaboration session; or
   the keyword and a second keyword, different than the keyword, are to occur within the synchronous multimedia collaboration sessions in order for the topic to be identified for the unscheduled synchronous multimedia collaboration session.

9. The one or more non-transitory computer-readable media as recited in claim 1, wherein the audio data is received at a first time, and wherein the operations further comprise:
   determining, at a second time that is subsequent to the first time, additional audio data representing the discussion; and
   updating, based at least in part on the additional audio data, the topic to maintain an accuracy of the topic with respect to the discussion.

10. The one or more non-transitory computer-readable media as recited in claim 1, wherein the data indicates that the at least one non-participating member has participated in a number of recurring synchronous multimedia collaboration sessions that are related to the unscheduled synchronous multimedia collaboration session, and wherein the operations further comprise determining that the at least one non-participating member is not currently participating in the unscheduled synchronous multimedia collaboration session.

11. The one or more non-transitory computer-readable media as recited in claim 1, wherein the operations further comprise determining the topic based at least in part on a current location associated with the at least one non-participating member.

12. A method, comprising:
   determining at least one of audio data representing a discussion occurring within an unscheduled synchronous multimedia collaboration session associated with a group-based communication system or non-audio data representing at least one of the discussion, a description of the unscheduled synchronous multimedia collaboration session, or a title of the unscheduled synchronous multimedia collaboration session;
   determining, based at least in part on the at least one of the audio data or the non-audio data, a topic discussed in the unscheduled synchronous multimedia collaboration session;
   determining data associated with a participating member of participating members of the unscheduled synchronous multimedia collaboration session and at least one non-participating member of the unscheduled synchronous multimedia collaboration session, the data including at least one of messages exchanged between the participating member and the at least one non-participating member, the participating member and the at least one non-participating member both being members of a same virtual space of the group-based communication system, or the participating member and the at least one non-participating member both being included in a same group;
   determining, based at least in part on the data, that the at least one non-participating member is likely to be interested in the topic based at least in part on at least one of member data associated with the at least one non-participating member or channel content of at least one group-based communication channel, in which the at least one non-participating member is a member, of a plurality of group-based communication channels of the group-based communication system; and
   causing display, to the at least one non-participating member and via a user interface of the group-based communication system, of at least one of the unscheduled synchronous multimedia collaboration session or a list of recommended synchronous multimedia collaboration sessions that are determined to be related to at least one of the topic or the unscheduled synchronous multimedia collaboration session.

13. The method as recited in claim 12, wherein determining the topic further comprises:
   determining, during the unscheduled synchronous multimedia collaboration session, the audio data associated with the participating members;
   determining, based at least in part on the audio data, one or more keywords words uttered by at least one participating member of the participating members;
   presenting at least one keyword of the one or more keywords to at least one participating member of the participating members;

receiving, from the at least one participating member, a confirmation that the at least one keywords is representative of the topic; and determining the topic based at least in part on the one or more keywords and the confirmation.

14. The method as recited in claim 13, further comprising:

transcribing the audio data into textual data;

identifying the one or more keywords from the textual data; and comparing the one or more keywords to a plurality of keywords and a plurality of topics maintained by the group-based communication system.

15. The method as recited in claim 12, further comprising:

determining a summary of the unscheduled synchronous multimedia collaboration session based at least in part on the audio data; and causing display, to the at least one non-participating member and via the user interface, of the summary with the unscheduled synchronous multimedia collaboration session.

16. A system, comprising:

one or more processors;

memory; and one or more computer-executable instructions stored in the memory and executable by the one or more processors to perform operations comprising:

determining at least one of audio data representing a discussion occurring within an unscheduled synchronous multimedia collaboration session associated with a group-based communication system or non-audio data representing at least one of the discussion, a description of the unscheduled synchronous multimedia collaboration session, or a title of the unscheduled synchronous multimedia collaboration session;

determining, based at least in part on the at least one of the audio data or the non-audio data, a topic discussed in the unscheduled synchronous multimedia collaboration session;

determining data associated with a participating member of participating members of the unscheduled synchronous multimedia collaboration session and at least one non-participating member of the unscheduled synchronous multimedia collaboration session, the data including at least one of messages exchanged between the participating member and the at least one non-participating member, the participating member and the at least one non-participating member both being members of a same virtual space of the group-based communication system, or the participating member and the at least one non-participating member both being included in a same group;

determining, based at least in part on the data, that the at least one non-participating member is likely to be interested in the topic based at least in part on at least one of member data associated with the at least one non-participating member or channel content of at least one group-based communication channel, in which the at least one non-participating member is a member, of a plurality of group-based communication channels of the group-based communication system; and causing display, to the at least one non-participating member and via a user interface of the group-based communication system, of at least one of the unscheduled synchronous multimedia collaboration session or a list of recommended synchronous multimedia collaboration sessions that are determined to be related to at least one of the topic or the unscheduled synchronous multimedia collaboration session.

17. The system as recited in claim 16, wherein determining that the at least one non-participating member is likely to be interested in the topic comprises determining a relevancy score of the topic to the at least one non-participating member, wherein the operations further comprise determining the relevancy score based at least in part on at least one of activity associated with the at least one non-participating member within the group-based communication system or the member data included in a user profile associated with the at least one non-participating member.

18. The system as recited in claim 16, wherein determining the topic further comprises:

determining, during the unscheduled synchronous multimedia collaboration session, the audio data associated with the participating members;

transcribing the audio data into textual data;

determining, based at least in part on the audio data and the textual data, one or more keywords words uttered by at least one participating member of the participating members;

comparing the one or more keywords to a plurality of keywords and a plurality of topics maintained by the group-based communication system;

presenting at least one keyword of the one or more keywords to at least one participating member of the participating members;

receiving, from the at least one participating member, a confirmation that the at least one keywords is representative of the topic; and determining the topic based at least in part on the one or more keywords and the confirmation.

19. The system as recited in claim 16, wherein the operations further comprise:

determining a summary of the unscheduled synchronous multimedia collaboration session based at least in part on the audio data; and causing display, to the at least one non-participating member and via the user interface, of the summary with the unscheduled synchronous multimedia collaboration session.

20. The system as recited in claim 16, wherein the operations further comprise:

determining a summary of the unscheduled synchronous multimedia collaboration session based at least in part on the audio data; and causing display, to the at least one non-participating member and via the user interface, of the summary with the list of recommended synchronous multimedia collaboration sessions.

* * * * *